US009810562B2

(12) United States Patent
Powers et al.

(10) Patent No.: US 9,810,562 B2
(45) Date of Patent: Nov. 7, 2017

(54) BRACE BAR FOR A VIBRATING METER

(71) Applicant: Micro Motion, Inc., Boulder, CO (US)

(72) Inventors: Philip Powers, Boulder, CO (US);
Glenn Byron, Colorado Springs, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 15/029,476

(22) PCT Filed: Nov. 6, 2014

(86) PCT No.: PCT/US2014/064258
§ 371 (c)(1),
(2) Date: Apr. 14, 2016

(87) PCT Pub. No.: WO2015/073288
PCT Pub. Date: May 21, 2015

(65) Prior Publication Data
US 2016/0265956 A1  Sep. 15, 2016

Related U.S. Application Data

(60) Provisional application No. 61/903,850, filed on Nov. 13, 2013.

(51) Int. Cl.
*G01F 1/84* (2006.01)
(52) U.S. Cl.
CPC .......... *G01F 1/8413* (2013.01); *G01F 1/8477* (2013.01)

(58) Field of Classification Search
CPC .......................................................... G01F 1/84
USPC ...................................... 73/861.355–861.357
See application file for complete search history.

(56) References Cited

U.S. PATENT DOCUMENTS

| 5,370,002 A * | 12/1994 | Normen | G01F 1/8413 |
| | | | 73/861.355 |
| 6,782,762 B2 * | 8/2004 | Cage | G01F 1/8477 |
| | | | 73/861.355 |
| 2001/0037690 A1 * | 11/2001 | Bitto | G01F 1/8404 |
| | | | 73/861.355 |

FOREIGN PATENT DOCUMENTS

WO    0225224 A1    3/2002

* cited by examiner

*Primary Examiner* — Jewel V Thompson
(74) *Attorney, Agent, or Firm* — The Ollila Law Group LLC

(57) ABSTRACT

A brace bar (300, 400, 500, 600, 700) is provided. The brace bar (300, 400, 500, 600, 700) includes a brace bar body (302, 402, 502, 602, 702) with a perimeter, a first aperture (304a, 404a, 504a, 604a, 704a) and a second aperture (304b, 404b, 504b, 604b, 704b) in the brace bar body (302, 402, 502, 602, 702), and a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter of the brace bar body (302, 402, 502, 602, 702).

31 Claims, 6 Drawing Sheets

BRACE BAR FOR A VIBRATING METER

CROSS-REFERENCE TO RELATED APPLICATIONS

This is a National Stage entry of International Application No. PCT/US14/64258, with an international filing date of Nov. 6, 2014 which claims priority of U.S. provisional patent application No. 61/903,850, filed Nov. 13, 2013, entitled "BRACE BAR FOR A VIBRATING METER".

TECHNICAL FIELD

The embodiments described below relate to vibrating meters and, more particularly, to brace bars for vibrating meters.

BACKGROUND

It is known to use vibrating meters to measure mass flow and other information of materials flowing through a pipeline. One particular type of vibrating meter is a vibrating Coriolis flow meter as disclosed in U.S. Pat. No. 4,491,025 issued to J. E. Smith, et al. of Jan. 1, 1985 and Re. 31,450 to J. E. Smith of Nov. 29, 1983. These vibrating meters have one or more fluid tubes. Each fluid tube configuration in a Coriolis mass flow meter has a set of natural vibration modes, which may be of a simple bending, torsional, radial, lateral, or coupled type. Each fluid tube is driven to oscillate at resonance in one of these natural modes. The vibration modes are generally affected by the combined mass, stiffness, and damping characteristics of the containing fluid tube and the material contained therein. Material flows into the flow meter from a connected pipeline on the inlet side manifold of the vibrating meter. The material is then directed through the fluid tube or fluid tubes and exits the flow meter to a pipeline connected on the outlet side manifold.

Brace bars are used on flow meters to reduce stress on welded joints where the flow tubes are attached to the manifolds. The brace bars are typically affixed to the two flow tubes at a point between the driver location on the flow tubes and the welded joint that affixes the flow tubes to the manifold. A separate brace bar is affixed to the flow tubes at both the inlet and outlet sides of the tubes to fix the positions of the flow tubes with respect to one another. The brace bar defines a new pivot axis for the out-of-phase vibrations of the flow tubes. The brace bars are typically brazed to the flow tubes on the brace bar's inner circumference.

To effectively reduce the stress on the welded joints, it is important that the brazing between the flow tube and the brace bar is not flawed. Flaws can be prevented by minimizing the flow tube gap between the flow tubes in the brace bar. However, the flow tube gap must also be sufficient for the flow tubes to be inserted into the brace bar without damaging the flow tubes. The gaps sufficient to allow insertion of the flow tubes can lead to flaws such as voids. Once a void in the brazing material is discovered, the brace bar is typically discarded resulting in increased costs for the manufacturer. Similar problems occur with other coupling processes such as welding.

Accordingly there is a need to minimize the flow tube gap while allowing the flow tube to be inserted into the brace bar.

SUMMARY

A brace bar is provided that, according to an embodiment, comprises a brace bar body with a perimeter, a first aperture and a second aperture in the brace bar body, and a gap formed in the brace bar body connecting the first aperture and the second aperture wherein the gap is wholly contained within the perimeter of the brace bar body.

A method of forming a brace bar is provided. According to an embodiment, the method comprises forming a brace bar body with a perimeter, forming a first aperture and a second aperture in the brace bar body, and forming a gap in the brace bar body connecting the first aperture and the second aperture wherein the gap is wholly contained within the perimeter of the brace bar body.

A method of coupling a brace bar to flow tubes is provided. According to an embodiment, the method comprises forming a brace bar with a brace bar body having a perimeter, a first aperture and a second aperture in the brace bar body, and a gap connecting the first aperture and the second aperture wherein the gap is wholly contained within the perimeter in the brace bar body. The method further comprises inserting the flow tubes in the apertures and applying a clamping force to the perimeter of the brace bar body to reduce the diameter of the apertures.

A vibrating meter, comprised of at least one flow tube and a brace bar, is provided. According to an embodiment, the brace bar is comprised of a brace bar body having a perimeter, a first aperture and a second aperture in the brace bar body, and a gap formed in the brace bar body connecting the first aperture and the second aperture wherein the gap is wholly contained within the perimeter in the brace bar body and the brace bar is coupled to the at least one flow tube inserted into one of the apertures.

ASPECTS

According to an aspect, a brace bar (300, 400, 500, 600, 700) comprises a brace bar body (302, 402, 502, 602, 702) with a perimeter, a first aperture (304a, 404a, 504a, 604a, 704a) and a second aperture (304b, 404b, 504b, 604b, 704b) in the brace bar body (302, 402, 502, 602, 702), and a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter of the brace bar body (302, 402, 502, 602, 702).

Preferably, the brace bar body (302, 402, 502, 602, 702) is adapted to reduce a diameter of at least one of the apertures (304, 404, 504, 604, 704) when a clamping force is applied to a perimeter of the brace bar body (302, 402, 502, 602, 702).

Preferably, the clamping force is directed towards a geometric center of the brace bar body (302, 402, 502, 602, 702).

Preferably, the brace bar body (302, 402, 502, 602, 702) is adapted to close the gap (306, 406, 506, 606, 706) when a clamping force is applied to the perimeter of the brace bar body (302, 402, 502, 602, 702)

Preferably, the apertures (304, 404, 504, 604) are adapted to constrict around the flow tubes (202) when a clamping force is applied to the perimeter of the brace bar body (302, 402, 502, 602).

Preferably, the brace bar body (302, 402, 502, 602) further comprises a wedge portion adapted to slide against a surface of the gap (306, 406, 506, 606) to constrict around a flow tube (202) when a clamping force is applied to the brace bar body (302, 402, 502, 602).

Preferably, at least a portion of the gap (306, 406, 506, 606) is tangentially aligned with the first aperture (304a, 404a, 504a, 604a) or the second aperture (304b, 404b, 504b, 604b).

Preferably, at least one bevel (308) formed in the brace bar body (302) proximate the gap (306) such that the at least one bevel (308) widens a portion of the gap (306).

Preferably, the gap (306, 406, 506, 606, 706) is point symmetric about the geometric center of the brace bar body (302, 402, 502, 602, 702).

Preferably, the gap (306, 606, 706) is a straight line.

Preferably, the gap (406) is Z-shaped.

Preferably, the gap (506) is S-shaped.

Preferably, the brace bar body (602) is comprised of two brace bar bodies (602a,b) coupled together to form the brace bar body (602).

According to another aspect, a method of forming a brace bar (300, 400, 500, 600, 700), comprises forming a brace bar body (302, 402, 502, 602, 702) with a perimeter, forming a first aperture (304a, 404a, 504a, 604a, 704a) and a second aperture (304b, 404b, 504b, 604b, 704b) in the brace bar body (302, 402, 502, 602, 702), and forming a gap (306, 406, 506, 606, 706) in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained in the brace bar body (302, 402, 502, 602, 702).

Preferably, the method further comprises adapting the brace bar body (302, 402, 502, 602, 702) to reduce a diameter of at least one of the apertures (304, 404, 504, 604, 704) when a clamping force is applied to the perimeter of the brace bar body (302, 402, 502, 602, 702).

Preferably, the method further comprises directing the clamping force towards the geometric center of the brace bar body (302, 402, 502, 602, 702).

Preferably, the method further comprises adapting the brace bar body (302, 402, 502, 602, 702) to close the gap (306, 406, 506, 606, 706) when a clamping force is applied to the perimeter of the brace bar body (302, 402, 502, 602, 702)

Preferably, the method further comprises adapting the apertures (304, 404, 504, 604) to constrict around the flow tubes (202) when a clamping force is applied to the perimeter of the brace bar body (302, 402, 502, 602).

Preferably, the method further comprises forming and adapting a wedge portion in the brace bar body (302, 402, 502, 602) to slide against a surface of the gap (306, 406, 506, 606) to constrict around a flow tube (202) when a clamping force is applied to the brace bar body (302, 402, 502, 602).

Preferably, the method further comprises tangentially aligning a portion of the gap (306, 406, 506, 606) with the first aperture (304a, 404a, 504a, 604a) or the second aperture (304b, 404b, 504b, 604b).

Preferably, the method further comprises forming at least one bevel (308) in the brace bar body (302) proximate the gap (306) such that the at least one bevel (308) widens a portion of the gap (306).

Preferably, the method further comprises forming the gap (306, 406, 506, 606, 706) to be point symmetric about the geometric center of the brace bar body (302, 402, 502, 602, 702).

Preferably, the method further comprises forming the gap (306, 606, 706) to be a straight line.

Preferably, the method further comprises forming the gap (406) to be Z-shaped.

Preferably, the method further comprises forming the gap (506) to be S-shaped.

Preferably, the method further comprises forming and coupling two brace bar bodies (602a,b) together to form the brace bar body (602).

According to another aspect, a method of coupling a brace bar (300, 400, 500, 600, 700) to flow tubes (202) comprises forming a brace bar (300, 400, 500, 600) with a brace bar body (302, 402, 502, 602, 702) having a perimeter, a first aperture (304a, 404a, 504a, 604a, 704a) and a second aperture (304b, 404b, 504b, 604b, 704b) in the brace bar body (302, 402, 502, 602, 702), and a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter in the brace bar body (302, 402, 502, 602, 702), inserting the flow tubes (202) in the apertures (304, 406, 506, 606, 706) and applying a clamping force to the perimeter of the brace bar body (302, 402, 502, 602, 702) to reduce the diameter of the apertures (304, 406, 506, 606, 706).

Preferably, the method further comprises sliding surfaces that define the gap (306, 406, 506, 606) along each other.

Preferably, the method further comprises constricting the apertures (304, 404, 504, 604) about the flow tubes (202).

Preferably, the method further comprises applying the clamping force towards the geometric center of the brace bar body (302, 402, 502, 602, 702).

According to another aspect, a vibrating meter (5) is comprised of at least one flow tube (202), a brace bar (300, 400, 500, 600, 700) comprised of a brace bar body (302, 402, 502, 602, 702) having a perimeter, a first aperture (304a, 404a, 504a, 604a, 704a) and a second aperture (304b, 404b, 504b, 604b, 704b) in the brace bar body (302, 402, 502, 602, 702), and a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter in the brace bar body (302, 402, 502, 602, 702), wherein the brace bar (300, 400, 500, 600, 700) is coupled to the at least one flow tube (202).

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of embodiments of a brace bar for a vibrating meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the brace bar for a vibrating meter. As a result, the embodiments described below are not limited to the specific examples described below, but only by the claims and their equivalents.

Figure 1:
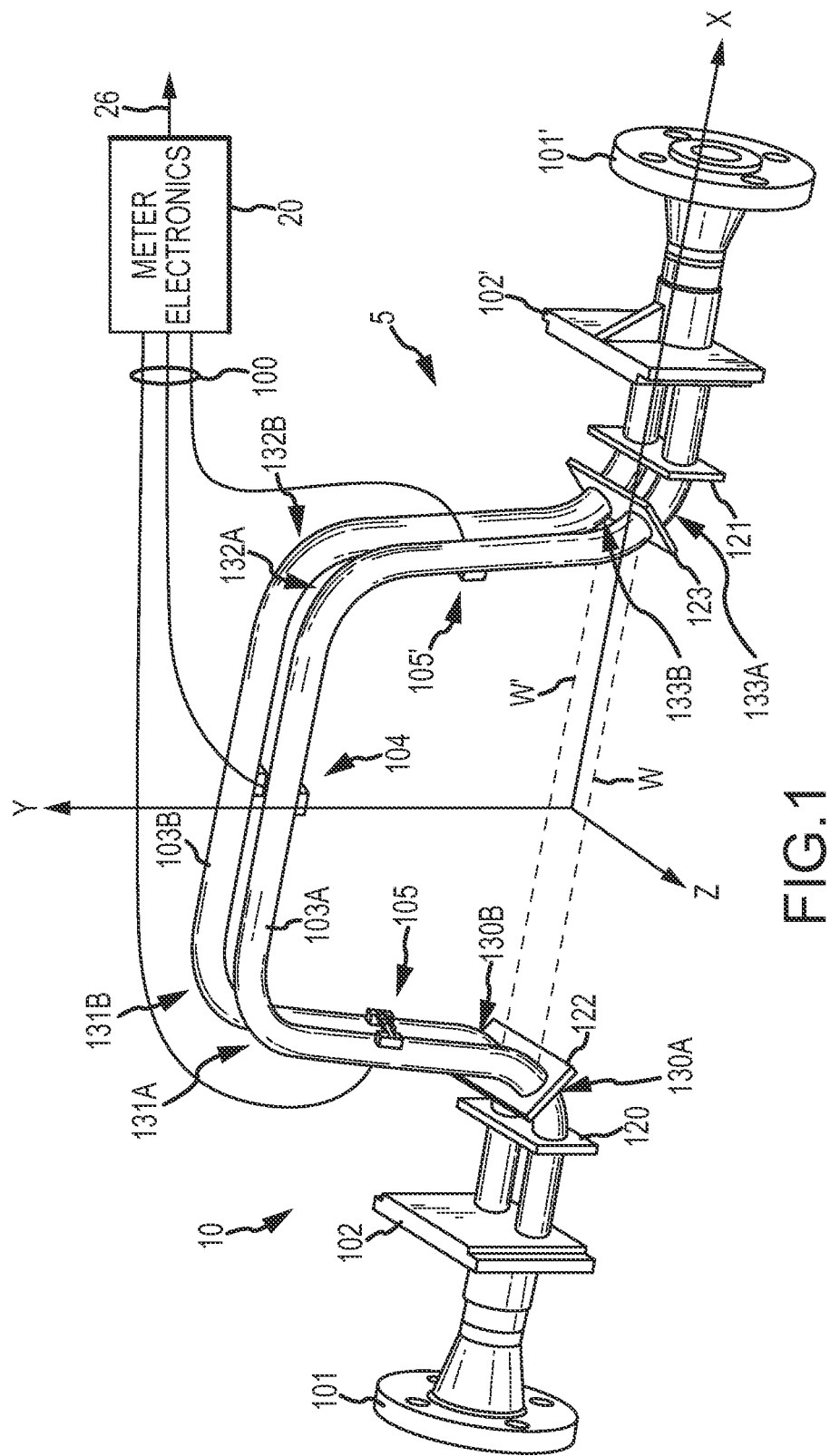
FIG. 1 shows a prior art vibrating meter 5 in the form of a meter comprising a sensor assembly 10 and one or more meter electronics 20.

FIG. 1 shows a prior art vibrating meter 5 that includes a sensor assembly 10 and one or more meter electronics 20. The vibrating meter 5 can be a Coriolis flow meter, a vibrating volumetric flow meter, a vibrating densitometer, etc. The meter electronics 20 is connected to the sensor assembly 10 via leads 100 to measure a characteristic of a substance, such as, for example, a fluid density, a mass flow rate, a volume flow rate, a totalized mass flow, a temperature, and other information over path 26. The sensor assembly 10 of the present example includes a pair of flanges 101, 101'; manifolds 102, 102'; a driver 104; pick-offs 105, 105'; and flow tubes 103A, 103B. The driver 104 and pick-offs 105, 105' are coupled to the flow tubes 103A and 103B as is generally known in the art. In use, the flanges 101, 101' can be coupled to a pipeline (not shown) carrying a fluid.

Flanges 101, 101' of the present example are coupled to the manifolds 102, 102'. The manifolds 102, 102' of the present example are affixed to opposite ends of the flow tubes 103A, 103B. Brace bars 120-123 are further coupled to the flow tubes 103A, 103B to define the bending axes W, W' of the flow tubes 103A, 103B. When the sensor assembly 10 is inserted into a pipeline system (not shown) which carries the substance, the substance enters sensor assembly 10 through the flange 101, passes through the inlet manifold 102 where the total amount of material is directed to enter the flow tubes 103A, 103B, flows through the flow tubes 103A, 103B, and back into the outlet manifold 102' where it exits the sensor assembly 10 through the flange 101'.

As is generally known in the art, the driver 104 can vibrate the flow tubes 103A, 103B in a drive mode in the z-direction, generally about the x-axis. Therefore, the drive mode vibrates the flow tubes 103A, 103B in a direction generally perpendicular to the longitudinal axis of the fluid tubes. As the flow tubes 103A, 103B are vibrated about the x-axis, the flowing fluid induces Coriolis deflections in the two flow tubes 103A, 103B, which is measured as a phase difference between the first and second pick-offs 105, 105'. The phase difference between the pick-offs 105, 105' is multiplied by the flow calibration factor to calculate a mass flow rate. As discussed in the foregoing, the brace bars 120-123 are typically brazed to the flow tubes 103A and 103B. However, there can be gaps between the brace bars 120-123 and the flow tubes 130A and 103B, as explained in the following with reference to FIG. 2.

Figure 2:
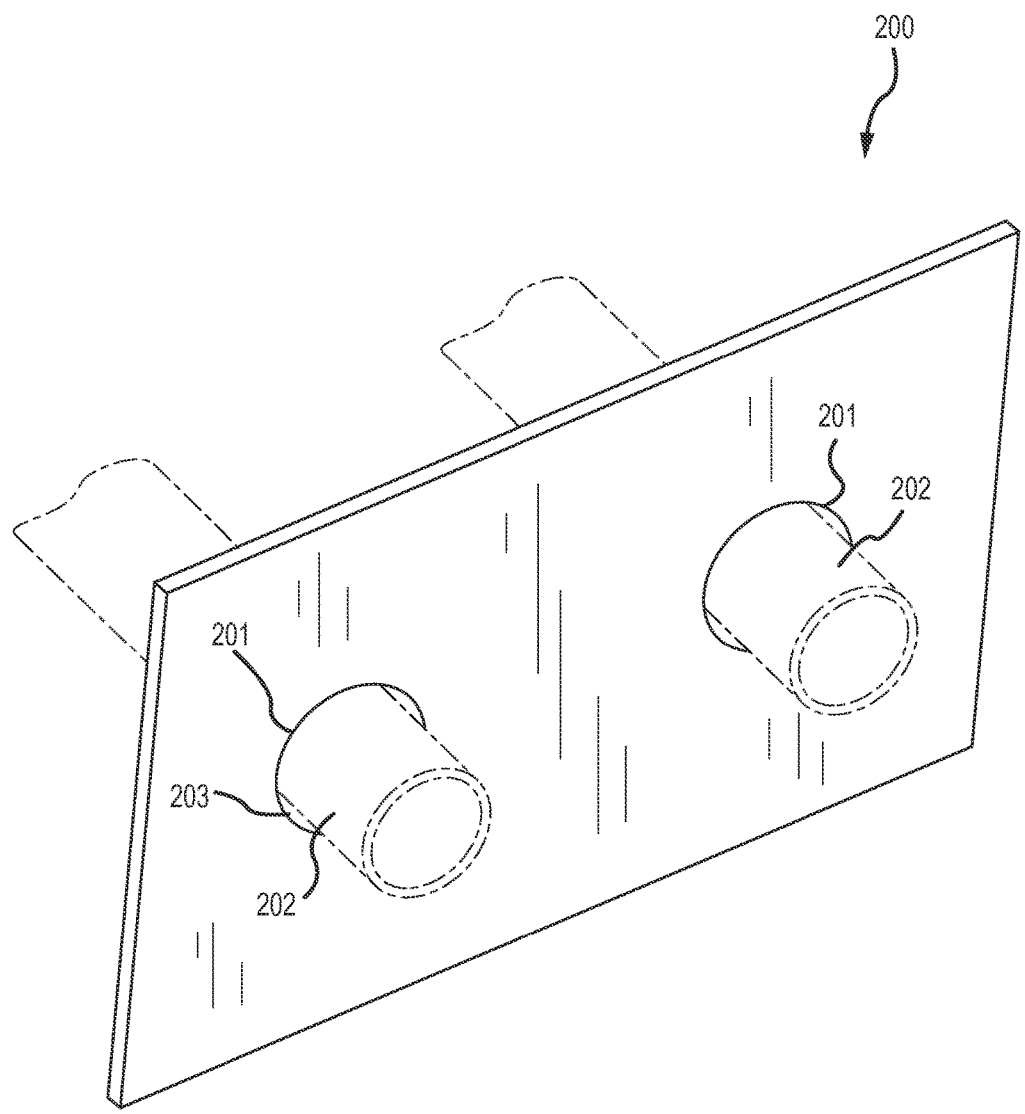
FIG. 2 shows a prior art brace bar 200 for a flow tube 202.

FIG. 2 shows a prior art brace bar 200 for a flow tube 202. The brace bar 200 includes a plurality of flow tube apertures 201, which are sized and located to accept flow tubes 202. As can be seen, the flow tube apertures 201 are slightly larger than the outer circumference of the flow tubes 202. This enlargement is necessary so the flow tubes 202 are not damaged while being inserted into the brace bar 200. Tighter tolerances will be prohibitively expensive. As a result, a flow tube gap 203 exists between the flow tube apertures 201 and the outer circumference of the flow tubes 202.

The flow tube gap 203 can be problematic when a manufacturer attempts to couple the brace bar 200 to the flow tubes 202. The flow tube gap 203 can cause voids in the coupling material or can cause uneven stress points which can result in a premature failure of the brace bar 200. Additionally, a large amount of coupling material must be used to fill the flow tube gap 203, thus resulting in increased costs associated with the brace bar 200. Typically, the coupling material has less strength than the flow tubes 202. Thus, the greater amount of coupling material necessary, the weaker the coupling. The embodiments described in the following FIGS. 3-7 overcome these and other issues associated with prior art brace bars.

Figure 3:
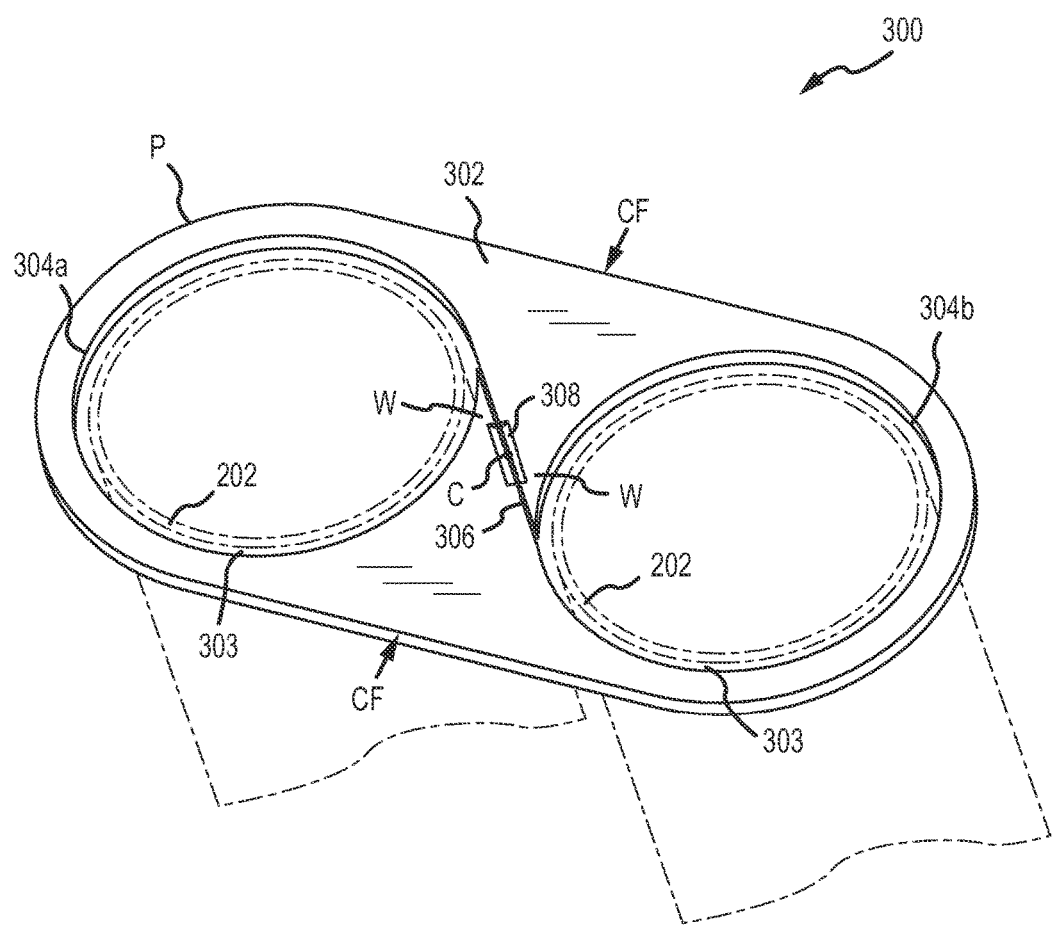
FIG. 3 shows a perspective view of a brace bar 300 according to an embodiment.

FIG. 3 shows a perspective view of a brace bar 300 according to an embodiment. As can be seen, the brace bar 300 includes a brace bar body 302 having a perimeter P. The brace bar body 302 is a flat piece of material, such as metal, with a first aperture 304a and a second aperture 304b in which flow tubes 202 can be inserted. A flow tube gap 303 is formed between the flow tubes 202 and the apertures 304. A gap 306 connects the first aperture 304a and the second aperture 304b. In the embodiment shown in FIG. 3, a bevel 308 is formed in the gap 306 in which a weld can be formed to, for example, tack weld the gap 306 prior to brazing.

Figure 4:
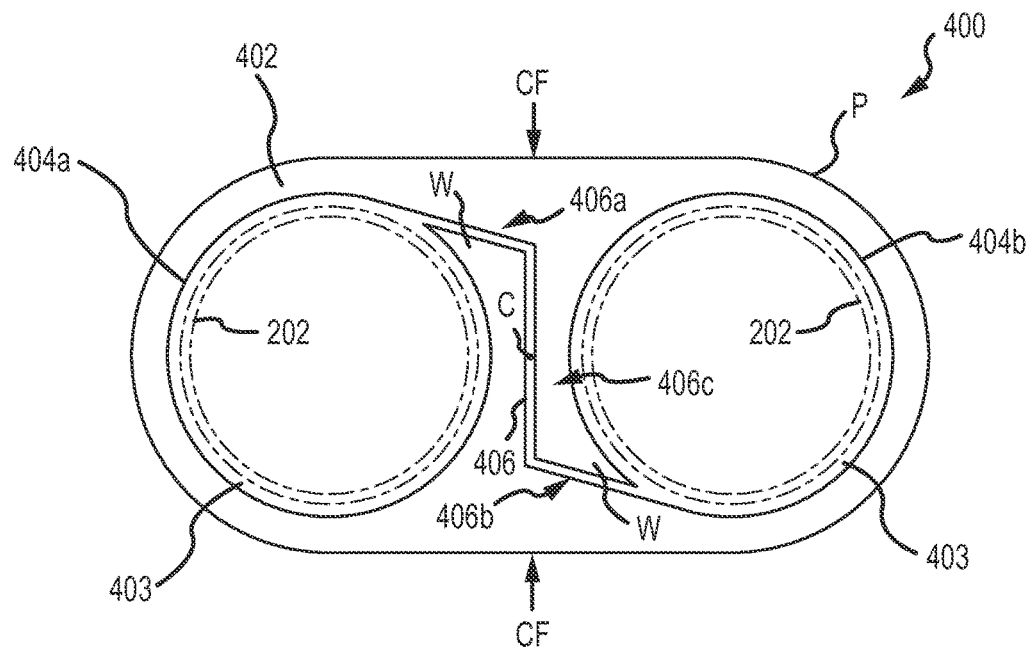
FIG. 4 shows a plan view of a second brace bar 400 according to another embodiment.

FIG. 4 shows a plan view of a second brace bar 400 according to another embodiment. Similar to the first brace bar 300, the second brace bar 400 has a brace bar body 402 that includes a first aperture 404a and a second aperture 404b. Flow tube gaps 403 are formed when the flow tubes 202 are inserted into the apertures 404a,b. A gap 406 connects the first aperture 404a and the second aperture 404b. The gap 406 is Z-shaped. That is, the gap 406 is comprised of a first portion 406a and a second portion 406b and a center portion 406c. The center portion 406c is shown as coaxial with the direction of the clamping force CF. The center portion 406c is also shown as traversing a geometric center C of the brace bar body 402. The first portion 406a and the second portion 406b are tangential to the first aperture 404a and the second aperture 404b, respectively.

Figure 5:
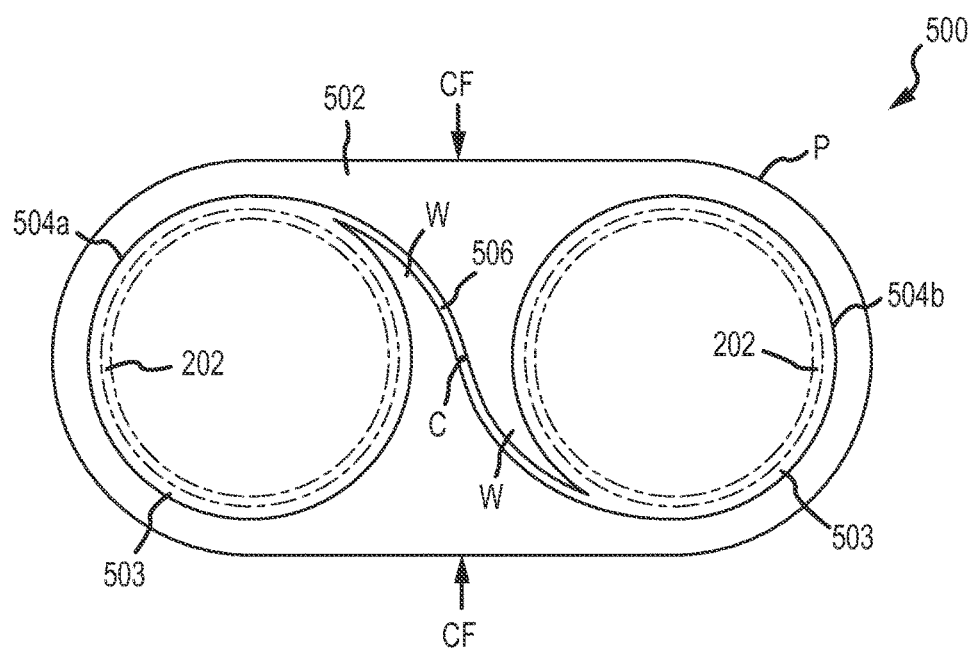
FIG. 5 shows a plan view of a third brace bar 500 according to another embodiment.

FIG. 5 shows a plan view of a third brace bar 500 according to another embodiment. Similar to the first and second brace bar 300, 400, the third brace bar 500 has a brace bar body 502 that includes a first aperture 504a and a second aperture 504b. Flow tube gaps 503 are formed when the flow tubes 202 are inserted into the apertures 504a,b. A gap 506 connects the first aperture 504a and the second aperture 504b. The gap 506 is shown as S-shaped. Similar to the fourth brace bar 400, the gap 506 has portions that are tangential to the apertures 504a,b as well as a center portion that traverses the geometric center C of the brace bar body 502.

Figure 6:
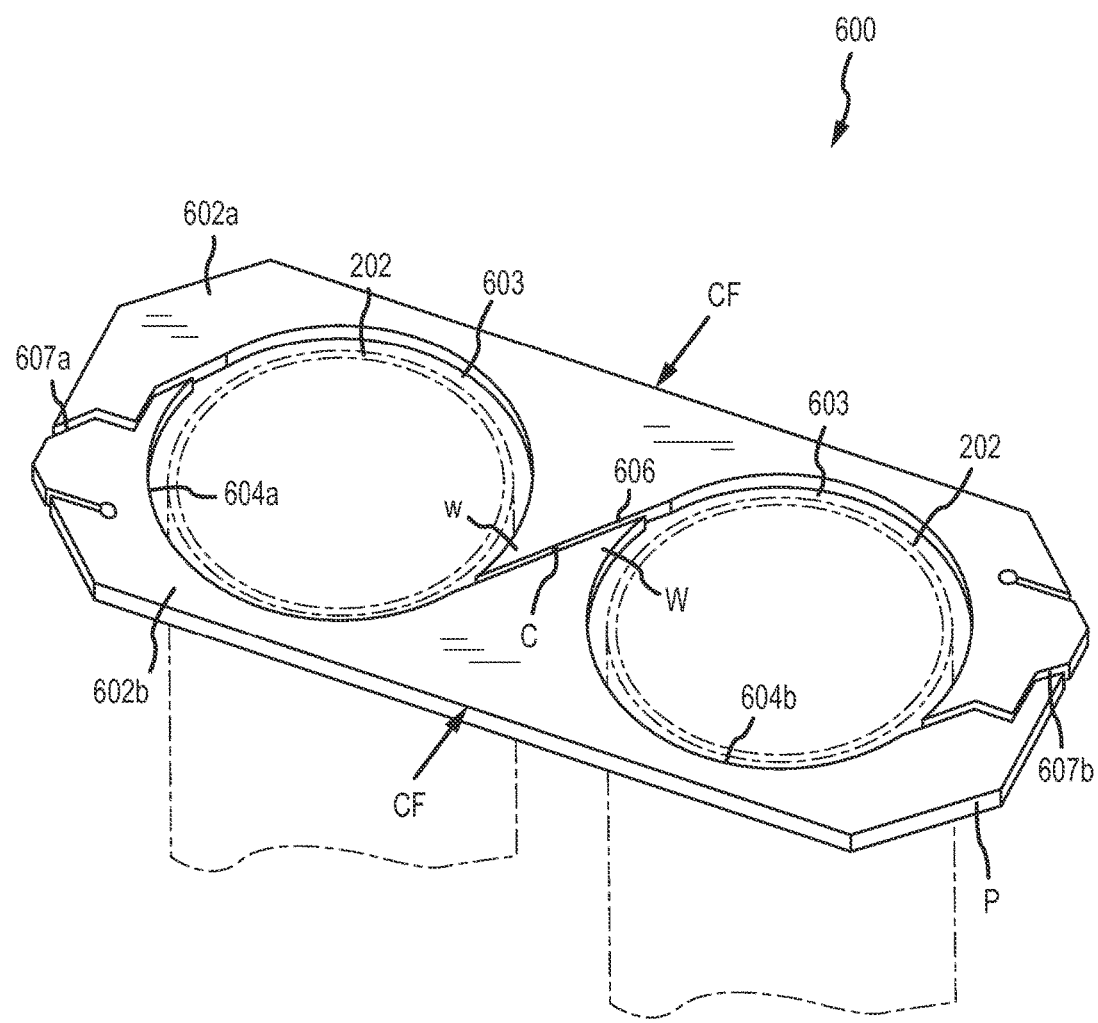
FIG. 6 shows a perspective view of a fourth brace bar 600 according to another embodiment.

FIG. 6 shows a perspective view of a fourth brace bar 600 according to another embodiment. The fourth brace bar 600 is comprised of two brace bar bodies 602a,b that are coupled together to form a brace bar body 602. When the two brace bar sections 602a,b are coupled together, a first aperture 604a, a second aperture 604b, and a gap 606 are formed. The flow tubes 202 are inserted into the apertures 604a,b to form a flow tube gap 603. The two brace bar bodies 602a,b also include mating profiles 607a,b that are adapted to align the two brace bar bodies 602a,b.

Figure 7:
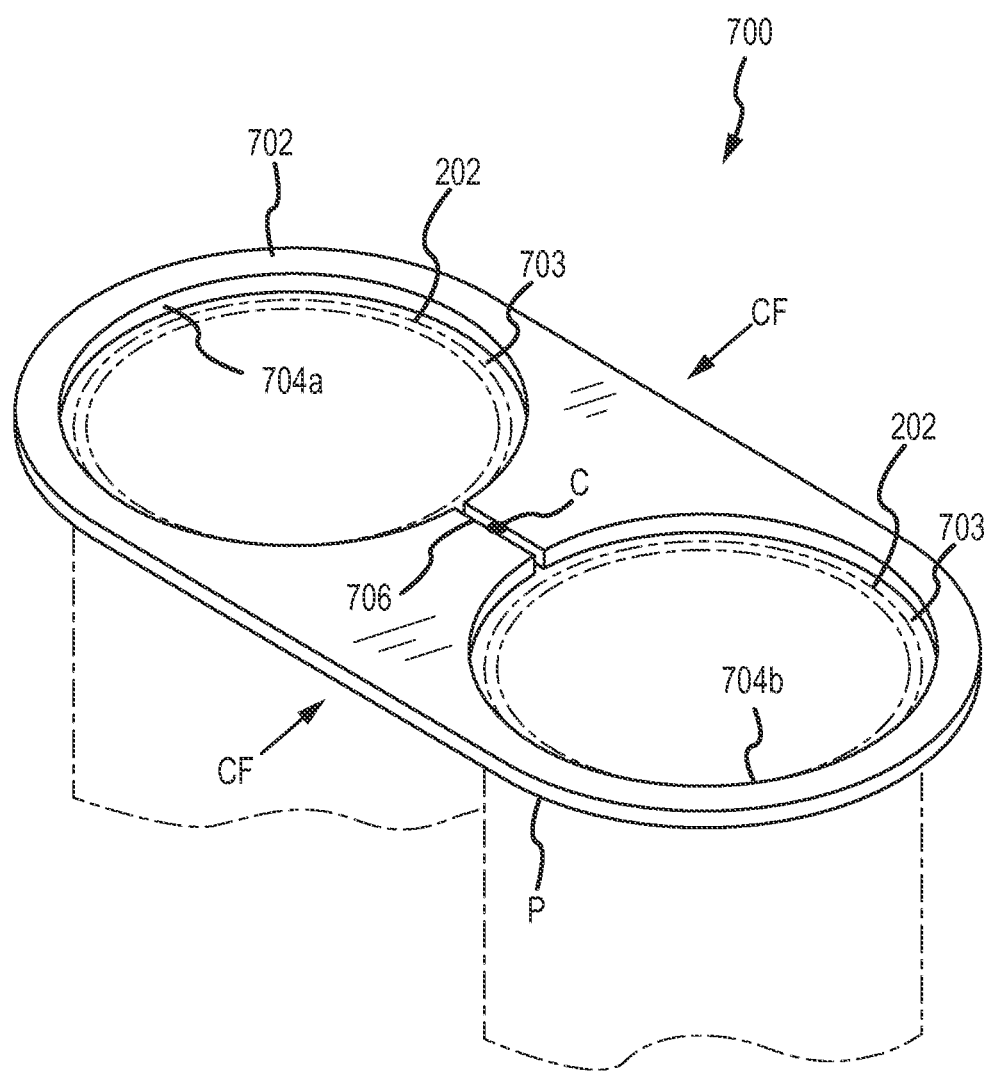
FIG. 7 shows a perspective view of a fifth brace bar 700 according to another embodiment.

FIG. 7 shows a perspective view of a fifth brace bar 700 according to another embodiment. As can be seen, the brace bar 700 includes a brace bar body 702 having a perimeter P. The brace bar body 702 is a flat piece of material, such as metal, with a first aperture 704a and a second aperture 704b in which flow tubes 202 can be inserted. A flow tube gap 703 is formed between the flow tubes 202 and the apertures 704. A gap 706 connects the first aperture 704a and the second aperture 704b. The gap 706 is shown as a straight gap connecting the closest points of the first aperture 704a and the second aperture 704b. In addition, the gap 706 is not tangential to the apertures 704a,b. The brace bar body 702 also does not have wedge portions. In the embodiment shown, the surfaces defining the gap 706 also may not slide with respect to each other. For example, the clamping force CF can press the surfaces defining the gap 706 towards each other until the gap 706 is closed. In addition, the apertures 704a,b can be sized such that the gap 703 is substantially uniform when the apertures 704a,b are closed about the flow tubes 202.

In the embodiments shown in FIGS. 3-7, the gap 306-706 is wholly contained within a perimeter P of the brace bar body 302-702. For example, the gap 306-706 is shown as defined by two contiguous surfaces connecting the first aperture 304a-704a and the second aperture 304b-704b. The two contiguous surfaces in the brace bar body 302-702 also do not intersect with the perimeter P of the brace bar body 302-702. For example, the gap 306-706 and the two contiguous surfaces continuously connect the first aperture 304a-704a and the second aperture 304b-704b. Although the embodiments are shown as contiguous, the surfaces may not necessarily be contiguous their entire length. For example, in alternative embodiments, the surfaces may include a wide gap (e.g., larger rectangle, circle, etc.). The gap 306-706 is also shown as point symmetric about the geometric center C of the brace bar body 302-702. However, in alternative embodiments, the gap 306-706 can be mirror symmetric, non-symmetric, or any other appropriate shape.

In the embodiments shown in FIGS. 3-6, wedge portions W of the brace bar body 302-602 are formed where the gap 306-606 intersects with the apertures 304-604. The wedge portions W are adapted to slide along one of the surfaces forming the gap 306-606 to reduce a diameter of the apertures 304-604. The wedge portions W can be formed due to the gap 306-606 being tangential to the apertures 304-604. For example, one of the surfaces forming the gap 306-606 is shown as merging continuously with the first aperture 304a-604a. The other surface merges continuously with the second aperture 304b-604b. In the embodiment shown in FIG. 7, the surfaces defining the gap 706 may not slide along each other. The diameter of the apertures 704a,b is reduced when the gap 706 is closed.

The diameter of the apertures 304-704 is a straight line that passes through a center of one of the apertures 304-704 that terminates on the apertures 304-704. In addition to the circular shape shown in FIGS. 1-7, the diameter may be associated with other shapes. That is, the apertures 304-704 can be oval shape, have arcuate segments of different radii or the like. The arcuate segments can be employed in the embodiments shown in FIGS. 3-7. For example, the wedge portions W of the brace bar body 302-602 can have arcuate segments with a radii that is different than the other segments of the apertures 304-704.

The embodiments shown in FIGS. 4 and 5 can reduce the diameter of the apertures 404, 504 more for a given clamping force CF than the embodiments shown in FIGS. 3 and 6. For example, the gaps 406, 506 have shapes that are not a straight line. Therefore, the length of the surfaces that form the gaps 406, 506 are longer than the straight line gap 306, 606 shown in FIGS. 3 and 6. In addition, the wedge portions W are longer in the brace bar bodies 402-502 with the Z or S shaped gaps 406, 506. The clamping force CF applied to the brace bar bodies 402, 502 therefore induces greater deflections of the wedge portions W than the embodiments shown in FIGS. 3 and 6.

The brace bar body 302-702 is adapted to close the gap 306-706 when a clamping force CF is applied to the perimeter P of the brace bar body 302-702. As shown in FIGS. 3-7, the clamping force CF is directed towards the geometric center C of the brace bar body 302-702. The clamping force CF is also equidistant between the center of the apertures 304a,b-704a,b. However, the clamping force CF can be in any appropriate direction. The clamping force CF can also be the sum of pressure applied to the perimeter P of the brace bar body 302-702. When the clamping force CF is applied, the gap 306-706 closes.

In the embodiments shown in FIGS. 3-6, the two surfaces defining the gap 306-606 slide along each other after the gap 306-606 is closed. The sliding further reduces a diameter of the apertures 304-604. The sliding may be proportional. For example, a deflection of one of the surfaces caused by the clamping force CF can be equal and opposite a deflection of the other of the surfaces defining the gap 306-606. However, in alternative embodiments, the deflection of the surfaces can be different. The flow tube gap 303-603 between the flow tubes 202 and the apertures 304-604 can therefore be reduced to a width that is suitable for brazing, welding, or the like.

The sliding can also constrict the apertures 304-604 to reduce the diameters of the apertures 304-604. For example, the gap 306-606, being tangential to the apertures 304-604, form the wedge portions W that slide in a direction that is tangential with the apertures 304-604. Accordingly, the apertures 304-604 constrict around the flow tubes 202. The flow tube gaps 303-603 between the flow tubes 202 and the apertures 304-604 are therefore reduced to a substantially uniform gap. For example, the width of the flow tube gaps 303-603 between the flow tubes 202 and the apertures 304-604 is substantially uniform along the entire circumference of the flow tube gaps 303-603.

The brace bar 300-700 is formed and coupled to the flow tubes 202 in the apertures 304-704. The brace bar 300-700 can be formed by stamping, cutting or any other suitable manufacturing process that forms the apertures 304-704 and the gap 306-706. After the brace bar 300-700 is formed, the flow tubes 202 are inserted into the apertures 304-704. A clamping force CF closes the gap 306-706. Closing the gap 306-706 reduces the diameter of the apertures 304-704. In the embodiments shown in FIGS. 3-6, the surfaces forming the gap 306-606 slide along each other to further reduce the diameter of the apertures 304-604. The clamping force CF can also constrict the apertures 304-604 around the flow tubes 202 so the flow tube gaps 303-603 remain substantially uniform. In the brace bar body 702 shown in FIG. 7, the gap 706 can close without sliding. Closing the gap 306-706 reduces the width of the flow tube gaps 303-703 to a width that is, for example, suitable for brazing.

The brazing material, which may be comprised of a boron-nickel alloy, can be applied before or after the clamping force CF is applied. In some embodiments, a tack weld can be applied to hold the gap 306-706 closed during brazing. For example, the tack weld can be formed in the bevel 308 in the brace bar body 302-702. After the brazing material is applied to the gap 306-706, the tubes 202 and brace bar 300-700 can be heated by, for example, a vacuum furnace. The melted brazing material then flows into the gap 306-706 and into the flow tube gaps 303-703. Alternatively, the gap 306-706 can be welded together and the brazing material fills the flow tube gaps 303-703. The brazing material is allowed to cool and solidify. Alternative to the brazing material, the flow tubes 202 can be welded to the brace bar 300-700 with, for example, an orbital TIG welder.

Other means of coupling the flow tubes 202 to the brace bar 300-700 can be employed. The clamping force CF can then be removed.

The embodiments described above provide a brace bar 300-700 for vibrating meters. As explained above, the brace bar 300-700 can reduce the width of the flow tube gap 306-606 between the apertures 304-704 and the flow tubes 202. The reduced width flow tube gap 306-606 is suitable for brazing. In addition, in some embodiments, the apertures 304-604 can constrict around the flow tubes 202 such that the flow tube gap 303-603 is substantially uniform the entire circumference. The substantially uniform flow tube gap 303-603 can ensure that no portion of the flow tube gap 303-603 exceeds a width that is suitable for brazing. The substantially uniform flow tube gap 303-603 also ensures that weak portions, such as voids or excessive material, do not form. In the embodiment shown in FIG. 7, surfaces determining the gap 706 can be closed together without sliding while also ensuring a substantially uniform gap 703. Since the diameter of the apertures 304-704 can be reduced, the flow tubes 202 can be inserted without being damaged while allowing a desired flow tube gap 303-703 (e.g., uniform, within a specified width, etc.) to be formed in brace bars 300-700 manufactured with less expensive tolerances.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other brace bars for vibrating meters, and not just to the embodiments described above and shown in the accompanying figures. Accordingly, the scope of the embodiments described above should be determined from the following claims.

We claim:

1. A brace bar (300, 400, 500, 600, 700), comprising:
    a brace bar body (302, 402, 502, 602, 702) with a perimeter;
    a first aperture (304a, 404a, 504a, 604a, 704a) and a second aperture (304b, 404b, 504b, 604b, 704b) in the brace bar body (302, 402, 502, 602, 702); and
    a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter of the brace bar body (302, 402, 502, 602, 702).

2. The brace bar (300, 400, 500, 600, 700) of claim 1 wherein the brace bar body (302, 402, 502, 602, 702) is adapted to reduce a diameter of at least one of the apertures (304, 404, 504, 604, 704) when a clamping force is applied to a perimeter of the brace bar body (302, 402, 502, 602, 702).

3. The brace bar (300, 400, 500, 600, 700) of claim 2 wherein the clamping force is directed towards a geometric center of the brace bar body (302, 402, 502, 602, 702).

4. The brace bar (300, 400, 500, 600, 700) of claim 1 wherein the brace bar body (302, 402, 502, 602, 702) is adapted to close the gap (306, 406, 506, 606, 706) when a clamping force is applied to the perimeter of the brace bar body (302, 402, 502, 602, 702).

5. The brace bar (300, 400, 500, 600) of claim 1 wherein the apertures (304, 404, 504, 604) are adapted to constrict around the flow tubes (202) when a clamping force is applied to the perimeter of the brace bar body (302, 402, 502, 602).

6. The brace bar (300, 400, 500, 600) of claim 1 wherein the brace bar body (302, 402, 502, 602) further comprises a wedge portion adapted to slide against a surface of the gap (306, 406, 506, 606) to constrict around a flow tube (202) when a clamping force is applied to the brace bar body (302, 402, 502, 602).

7. The brace bar (300, 400, 500, 600) of claim 1 wherein at least a portion of the gap (306, 406, 506, 606) is tangentially aligned with the first aperture (304a, 404a, 504a, 604a) or the second aperture (304b, 404b, 504b, 604b).

8. The brace bar (300) of claim 1 further comprising at least one bevel (308) formed in the brace bar body (302) proximate the gap (306) such that the at least one bevel (308) widens a portion of the gap (306).

9. The brace bar (300, 400, 500, 600, 700) of claim 1 wherein the gap (306, 406, 506, 606, 706) is point symmetric about a geometric center of the brace bar body (302, 402, 502, 602, 702).

10. The brace bar (300, 600, 700) of claim 1 wherein the gap (306, 606, 706) is a straight line.

11. The brace bar (400) of claim 1 wherein the gap (406) is Z-shaped.

12. The brace bar (500) of claim 1 wherein the gap (506) is S-shaped.

13. The brace bar (600) of claim 1 wherein the brace bar body (602) is comprised of two brace bar bodies (602a,b) coupled together to form the brace bar body (602).

14. A method of forming a brace bar (300, 400, 500, 600, 700), comprising:
    forming a brace bar body (302, 402, 502, 602, 702) with a perimeter;
    forming a first aperture (304a, 404a, 504a, 604a, 704a) and a second aperture (304b, 404b, 504b, 604b, 704b) in the brace bar body (302, 402, 502, 602, 702); and
    forming a gap (306, 406, 506, 606, 706) in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained in the brace bar body (302, 402, 502, 602, 702).

15. The method of forming the brace bar (300, 400, 500, 600, 700) of claim 14 further comprising adapting the brace bar body (302, 402, 502, 602, 702) to reduce a diameter of at least one of the apertures (304, 404, 504, 604, 704) when a clamping force is applied to the perimeter of the brace bar body (302, 402, 502, 602, 702).

16. The method of forming the brace bar (300, 400, 500, 600, 700) of claim 15 further comprising directing the clamping force towards the geometric center of the brace bar body (302, 402, 502, 602, 702).

17. The method of forming the brace bar (300, 400, 500, 600, 700) of claim 14 further comprising adapting the brace bar body (302, 402, 502, 602, 702) to close the gap (306, 406, 506, 606, 706) when a clamping force is applied to the perimeter of the brace bar body (302, 402, 502, 602, 702).

18. The method of forming the brace bar (300, 400, 500, 600) of claim 14 further comprising adapting the apertures (304, 404, 504, 604) to constrict around the flow tubes (202) when a clamping force is applied to the perimeter of the brace bar body (302, 402, 502, 602).

19. The method of forming the brace bar (300, 400, 500, 600) of claim 14 further comprising forming and adapting a wedge portion in the brace bar body (302, 402, 502, 602) to slide against a surface of the gap (306, 406, 506, 606) to constrict around a flow tube (202) when a clamping force is applied to the brace bar body (302, 402, 502, 602).

20. The method of forming the brace bar (300, 400, 500, 600) of claim 14 further comprising tangentially aligning a portion of the gap (306, 406, 506, 606) with the first aperture (304a, 404a, 504a, 604a) or the second aperture (304b, 404b, 504b, 604b).

21. The method of forming the brace bar (300) of claim 14 further comprising forming at least one bevel (308) in the brace bar body (302) proximate the gap (306) such that the at least one bevel (308) widens a portion of the gap (306).

22. The method of forming the brace bar (300, 400, 500, 600, 700) of claim 14 further comprising forming the gap (306, 406, 506, 606, 706) to be point symmetric about the geometric center of the brace bar body (302, 402, 502, 602, 702).

23. The method of forming the brace bar (300, 600, 700) of claim 14 further comprising forming the gap (306, 606, 706) to be a straight line.

24. The method of forming the brace bar (400) of claim 14 further comprising forming the gap (406) to be Z-shaped.

25. The method of forming the brace bar (500) of claim 14 further comprising forming the gap (506) to be S-shaped.

26. The method of forming the brace bar (600) of claim 14 further comprising forming and coupling two brace bar bodies (602a,b) together to form the brace bar body (602).

27. A method of coupling a brace bar (300, 400, 500, 600, 700) to flow tubes (202), the method comprising:
    forming a brace bar (300, 400, 500, 600, 700) with:
        a brace bar body (302, 402, 502, 602, 702) having a perimeter;
        a first aperture (304a, 404a, 504a, 604a, 704a) and a second aperture (304b, 404b, 504b, 604b, 704b) in the brace bar body (302, 402, 502, 602, 702); and
        a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter in the brace bar body (302, 402, 502, 602, 702);
    inserting the flow tubes (202) in the apertures (304, 406, 506, 606, 706); and
    applying a clamping force to the perimeter of the brace bar body (302, 402, 502, 602, 702) to reduce the diameter of the apertures (304, 406, 506, 606, 706).

28. The method of coupling the brace bar (300, 400, 500, 600) to the flow tubes (202) of claim 27 further comprising sliding surfaces that define the gap (306, 406, 506, 606) along each other.

29. The method of coupling the brace bar (300, 400, 500, 600) to the flow tubes (202) of claim 27 further comprising constricting the apertures (304, 404, 504, 604) about the flow tubes (202).

30. The method of coupling the brace bar (300, 400, 500, 600, 700) to the flow tubes (202) of claim 27 further comprising applying the clamping force towards a geometric center of the brace bar body (302, 402, 502, 602, 702).

31. A vibrating meter (5) comprised of:
    at least one flow tube (202); and
    a brace bar (300, 400, 500, 600, 700) comprised of:
        a brace bar body (302, 402, 502, 602, 702) having a perimeter;
        a first aperture (304a, 404a, 504a, 604a, 704a) and a second aperture (304b, 404b, 504b, 604b, 704b) in the brace bar body (302, 402, 502, 602, 702); and
        a gap (306, 406, 506, 606, 706) formed in the brace bar body (302, 402, 502, 602, 702) connecting the first aperture (304a, 404a, 504a, 604a, 704a) and the second aperture (304b, 404b, 504b, 604b, 704b) wherein the gap (306, 406, 506, 606, 706) is wholly contained within the perimeter in the brace bar body (302, 402, 502, 602, 702);
    wherein the brace bar (300, 400, 500, 600, 700) is coupled to the at least one flow tube (202).

* * * * *